United States Patent
Ueda et al.

(10) Patent No.: US 7,883,093 B2
(45) Date of Patent: Feb. 8, 2011

(54) MECHANICAL SEAL

(75) Inventors: Makoto Ueda, Sanda (JP); Satoshi Fujiwara, Sanda (JP); Mitsuru Kudari, Sanda (JP); Masanobu Ninomiya, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 687 days.

(21) Appl. No.: 11/631,045

(22) PCT Filed: Jul. 1, 2005

(86) PCT No.: PCT/JP2005/012225

§ 371 (c)(1),
(2), (4) Date: Jan. 16, 2007

(87) PCT Pub. No.: WO2006/004052

PCT Pub. Date: Jan. 12, 2006

(65) Prior Publication Data

US 2009/0189355 A1    Jul. 30, 2009

(30) Foreign Application Priority Data

Jul. 2, 2004 (JP) ............................. 2004-196510
Nov. 19, 2004 (JP) ............................. 2004-335434

(51) Int. Cl.
*F16J 15/34* (2006.01)

(52) U.S. Cl. ................. 277/371; 277/390; 277/401; 277/408

(58) Field of Classification Search ............... 277/370, 277/371, 375, 390, 400, 401, 408
See application file for complete search history.

(56) References Cited

U.S. PATENT DOCUMENTS

| | | | | |
|---|---|---|---|---|
| 4,408,765 A | * | 10/1983 | Adelmann, Jr. | 277/388 |
| 4,889,319 A | * | 12/1989 | Phillips et al. | 251/368 |
| 6,135,458 A | * | 10/2000 | Fuse | 277/401 |
| 6,325,378 B1 | * | 12/2001 | Okumachi et al. | 277/348 |
| 6,412,822 B1 | * | 7/2002 | Omiya et al. | 285/121.3 |
| 6,505,836 B1 | * | 1/2003 | Toshihiko | 277/400 |
| 2001/0052673 A1 | * | 12/2001 | Okumachi et al. | 277/348 |

FOREIGN PATENT DOCUMENTS

| | | | |
|---|---|---|---|
| GB | 2212867 A | * | 8/1989 |
| JP | 62-37573 | | 2/1987 |

(Continued)

*Primary Examiner*—Shane Bomar
*Assistant Examiner*—Gilbert Y Lee
(74) *Attorney, Agent, or Firm*—DLA Piper LLP (US)

(57) ABSTRACT

A mechanical non-contact gas seal including a rotary sealing ring and a stationary sealing ring that is engaged and held in an inner periphery of a seal case by means of O-rings so as to move in an axial direction thereof. The O-rings engage with the outer periphery of the stationary sealing ring and come in press contact with the inner periphery of the seal case to seal a gap between the stationary sealing ring and the seal case while allowing the stationary sealing ring to move in an axial direction. A resin coating of a thickness in the range of 5 to 100 μm is formed on the inner periphery of the seal case at least within a range in which the O-rings relatively move with the movement of the stationary sealing ring.

5 Claims, 11 Drawing Sheets

FOREIGN PATENT DOCUMENTS

| | | |
|---|---|---|
| JP | 3-277874 | 12/1991 |
| JP | 8-296744 | 11/1996 |
| JP | 9-196185 | 7/1997 |
| JP | 11287331 A * | 10/1999 |
| JP | 2003-100730 | 4/2003 |
| WO | WO 99/27281 | 6/1999 |

* cited by examiner

MECHANICAL SEAL

TECHNICAL FIELD

The present invention relates to a mechanical seal including a rotary sealing ring that is fixed to a rotating shaft, and a stationary sealing ring that is held by means of O-rings in a seal case through which the rotating shaft passes, so as to move in an axial direction thereof, the seal case being made of a metal, wherein the O-rings are held engaging with the periphery of the stationary sealing ring and come in press contact with the periphery of the seal case so as to give a secondary seal to a gap between the stationary sealing ring and the seal case, while allowing the stationary sealing ring to move in the axial direction thereof.

BACKGROUND ART

A static pressure type non-contact gas seal has been known as a conventional mechanical seal, including a rotary sealing ring that is fixed to a rotating shaft; a stationary sealing ring that is held by means of a pair of O-rings in a seal case through which the rotating shaft passes, so as to move in an axial direction thereof; and a spring that is interposed between the stationary sealing ring and the seal case so as to push the stationary sealing ring against the rotary sealing ring, wherein a communicating space sealed by the pair of O-rings is formed between the seal case and the stationary sealing ring, and a seal gas ejecting passage is formed as a series of passages that communicate with each other through the communicating space in the seal case and the stationary sealing ring, and is open between the sealing end faces serving as the opposite end faces of the both sealing rings, thereby so as to maintain the sealing end faces in proper non-contact state by introducing the seal gas under a predetermined pressure between the sealing end faces through the seal gas ejecting passage (for example, see Patent Document 1).

Meantime, when the seal conditions or the structural conditions taken into account in the above-mentioned static pressure type non-contact gas seal, it may be preferable or may be inevitable to hold the O-rings engaging with the periphery of the stationary sealing ring, as the case may be.

Patent Document 1: WO 99/27281 (FIG. 8)

However, the O-rings, being held engaging with the stationary sealing ring, slide in press contact with the periphery of the seal case in accordance with the movement of the stationary sealing ring in the axial direction thereof, and consequently cause the following problems.

That is, since the seal case is made of a metal having an excellent strength in view of the function, the O-rings do not slide smoothly following the movement of the stationary sealing ring owing to the high contact resistance between the O-rings and the seal case. As a result, the stationary sealing ring, which does not move smoothly in the axial direction thereof, deteriorates its own following ness so as to result in failure of an effective sealing function by the mechanical seal. Particularly, when the supply of the seal gas stops in the above-mentioned static pressure type non-contact gas seal, it is concerned that the stationary sealing ring, which does not smoothly move toward the rotary sealing ring, may intensively collide against the rotary sealing ring, so that the sealing end faces may be damaged by some possibility. To the contrary, when the supply of the seal gas stops, the stationary sealing ring does not move, but may form a gap between the sealing end faces. In this case, it is concerned that the resumed supply of the seal gas does not generate a proper static pressure between the sealing end faces but leads to the lost sealing function.

There occurs, similarly, such a problem in an end face contact type mechanical seal, in which the both sealing rings are slidably rotated relative to each other to obtain a sealing function, and also in a dynamic pressure type non-contact type mechanical seal which is configured to maintain the sealing end faces in non-contact state by dynamic pressure generated therebetween.

DISCLOSURE OF THE INVENTION

It is an object of the present invention to provide a mechanical seal that has an excellent following ness of a stationary sealing ring and performs a good sealing function without the above-mentioned problem.

According to an aspect of the present invention, a mechanical seal includes a rotary sealing ring that is fixed to a rotating shaft; and a stationary sealing ring that is held by means of O-rings in a seal case through which the rotating shaft passes, so as to move in an axial direction thereof, the seal case being made of a metal, wherein the O-rings are held engaging with the periphery of the stationary sealing ring, and come in press contact with the periphery of the seal case so as to give a secondary seal to a gap between the stationary sealing ring and the seal case, while allowing the stationary sealing ring to move in an axial direction thereof. It is particularly proposed to achieve the afore-mentioned object that a resin coating film is formed on the periphery of the seal case, and at least within a range in which the O-rings relatively move in accordance with the movement of the stationary sealing ring in the axial direction.

As a preferred embodiment of the mechanical seal according to the present invention, the mechanical seal is the static pressure type non-contact gas seal which includes a communicating space sealed by a pair of O-rings between the seal case and the stationary sealing ring, the pair of O-rings being provided away from each other at a predetermined interval, and a seal gas ejecting passage formed as a series of passages that communicate with each other through the communicating space in the seal case and the stationary sealing ring, with being open between the sealing end faces serving as the opposite end faces of the both sealing rings, thereby so as to maintain the sealing end faces in proper non-contact state by introducing the seal gas under a predetermined pressure into the space between the sealing end faces through the seal gas ejecting passage.

The above-mentioned static pressure type non-contact gas seal is also adopted as an effective seal device for the treatment device that performs a cleaning treatment on substrates (for example, a semiconductor wafer, a substrate of an electronic device, a liquid crystal substrate, a photomask, a glass substrate, and the like) by using a rotary table and the like, wherein advanced preventive measures against contamination are required in a treatment area in which the rotary table is disposed. For example, the above-mentioned static pressure type non-contact gas seal is used as the seal device for a treatment device, in which a driving unit of a rotary table is covered with a cylindrical plastic cover, so as to shield a space between a treatment area where the rotary table is disposed and an area inside the plastic cover. In this embodiment, the rotary sealing ring is fixed to the rotary table concentrically with the rotary axis thereof, the seal case is a cylindrical case which is disposed in the plastic cover and mounted on a supporting case of the driving unit, and the stationary sealing ring is held on an inner periphery of the seal case so as to move in an axial direction thereof, with being concentric with the rotary sealing ring and directly facing the rotary sealing ring. In this case, it is preferred that an annular cover shoulder contacting with an end of the seal case is formed on the inner periphery of the plastic cover, and that a seal gas supply passage is formed in the plastic cover for supplying the seal gas to the seal gas ejecting passage, and also that the seal gas supply passage and the seal gas ejecting passage formed in the seal case are connected so as to communicate with each other at a portion where the cover shoulder and the seal case end come in contact.

Furthermore, the afore-mentioned static pressure type non-contact gas seal is provided with a dynamic pressure generating channel formed on the sealing end face of one sealing ring so as to maintain the sealing end faces in non-contact state by generating a dynamic pressure in the space between the sealing end faces by means of the dynamic pressure generating channel, in addition to a static pressure by means of the seal gas.

In addition, when it is necessary for the sealed fluid to evade mixture of metal ingredients (metal ions or the like) or when the sealed fluid has a concerned possibility of metal corrosion, it is preferred to form the resin coating film on a portion with which the sealed fluid comes in contact, of the periphery of the seal case, inclusive of a portion on which the O-rings relatively move, in order to prevent the sealed fluid from coming in direct contact with the seal case made of a metal. Specifically, in the afore-mentioned static pressure type non-contact gas seal, it is preferred that the resin coating film be formed on the surface of the seal case and, if required, on portions with which the sealed fluid and/or the seal gas come in contact (inclusive of portions with which it or they may possibly come in contact), including a portion on which the O-rings slide, in order to prevent metal ingredients from generating because of the seal gas coming in contact with the seal case as well as the sealed fluid.

A low-friction plastic, which has a low contact resistance between the O-rings and the resin coating film, may be preferably used as a material of the resin coating film. Further, it may be preferred that a material having high corrosion resistance or chemical resistance is used as a material of the resin coating film depending on the property of the sealed fluid or sealing conditions. In general, a fluorocarbon polymer such as polytetrafluoroethylene (PTFE), which has a low friction and high corrosion resistance, is preferably used as a material of the resin coating film. In addition, the resin coating film preferably has a thickness in the range of 5 to 100 μm, and optimally 20 to 40 μm. The surface of the resin coating film (at least a portion on which the O-rings slide) is preferably machined to be a smooth surface.

According to the present invention, it is possible to provide a mechanical seal in which the O-rings smoothly slide on the seal case in accordance with the movement of a stationary sealing ring and has an excellent following ness of the stationary sealing ring. Accordingly, in a mechanical seal such as a static pressure type non-contact gas seal or the like, it is always possible to obtain excellent sealing function without the deterioration of the sealing function. A resin coating film covers a portion, with which the sealed fluid comes in contact (plus a portion with which the seal gas comes in contact in case of the static pressure type non-contact gas seal) of the seal case, as well as a portion, with which the O-rings come in contact, of the seal case. Accordingly, it is possible to prevent metal ions, which are generated by contacting the sealed fluid and/or seal gas with the seal case made of a metal, from being generated. In addition, even when it is necessary to prevent metal ions from being generated, it is possible to obtain an excellent sealing function. Moreover, a portion, with which the seal fluid comes in contact, of the case is covered with the resin coating film having high corrosion resistant or chemical resistant. Therefore, even when the sealed fluid has corrosiveness, the mechanical seal can obtain an effective sealing function without corrosion of the seal case made of a metal.

Meanwhile, when a substrate such as a semiconductor wafer is cleaned by means of the rotary table, it is necessary to maintain a treatment area, at which a rotary table is disposed, clean. In addition, it is necessary to reliably prevent particles from entering the treatment area from the driving unit of the rotary table. The conventional treatment device requiring such an advanced contamination-prevention measures has been proposed. That is, the conventional treatment device is provided with a seal between the rotary table and the plastic cover covering the driving unit thereof, in order to shield the treatment area, at which the rotary table is disposed, from the inside area of the cover. In general, a labyrinth seal or magnetic fluid seal is adopted as the above-mentioned seal (for example, see JP-A-11-265868). Since the conventional treatment device is provided with the seal, it is possible to prevent the particles from entering the treatment area from the inside area of the cover, whereby the substrate or the like is not contaminated. Furthermore, there is no problem that treatment remainders (cleaning solution, harmful matters or the like) generated at the treatment area enter the inside area of the cover to generate troubles in the driving system of the rotating shaft. However, the seal such as the labyrinth seal or the like provided in the conventional treatment device cannot sufficiently shield the treatment area from the inside area of the cover, and cannot provide complete contamination-prevention measures to the treatment device such as a substrate cleaning device. That is, in the labyrinth seal, an annular gap forming a labyrinth easily becomes unbalanced depending on accuracy of the rotation or device, and respiration caused by the unbalance of the labyrinth gap is generated. Therefore the both areas are not sufficiently shielded from each other. Further, even in the magnetic fluid seal, the quality is unstable. Therefore, the both areas are not sufficiently shielded from each other, like the labyrinth seal.

However, when the treatment device, in which the driving unit of the rotary table is covered with the cylindrical plastic cover, uses the mechanical seal of the invention as the seal for isolating the treatment area, at which the rotary table is disposed, from the are inside cover, it is possible to reliably shield the treatment area, at which the rotary table is disposed, from the inside area of the cover, at which the driving unit of the rotating shaft is disposed, compared to when the above-mentioned labyrinth seal is used as the seal. The mechanical seal according to the aspect of the invention is composed of a static pressure type non-contact gas seal in which the seal gas is ejected to the treatment area and the inside area of the cover through a gap between the rotary sealing ring of the rotary table and the stationary sealing ring of the plastic cover. Accordingly, when the mechanical seal (static pressure type non-contact gas seal) of the invention is used, it is possible to maintain the treatment at the treatment area in the clean atmosphere in which the particle is prevented from entering the treatment area from the inside area of the cover. Therefore, it is possible to satisfactorily perform the treatment such as a treatment of cleaning the substrate, and to provide the advanced contamination-prevention measures. Furthermore, it is possible to remove the problem that remainders of cleaning solution or harmful matters, which are generated at the treatment area, enter the inside area of the cover to generate troubles in the driving system of the rotating shaft. In addition, when a seal gas supply passage, which is used to supply seal gas to the seal gas ejecting passage, is formed in the plastic cover, if the seal gas supply passage is configured so that the gas flows from the seal gas supply passage to the seal gas ejecting passage (seal gas ejecting passage formed in the seal case) in the radial direction of the plastic cover, the plastic cover is deformed in the radial direction due to the gas pressure applied to the connection portion between the seal gas supply passage and the seal gas ejecting passage. Therefore, there has been a possibility that the seal gas is not satisfactorily supplied to the seal gas ejecting passage. However, in the mechanical seal (static pressure type non-contact gas seal) of the invention, since the seal gas supply passage is configured so that the gas flows from the seal gas supply passage to the seal gas ejecting passage (seal gas ejecting passage formed in the seal case) in the axial direction of the plastic cover, the plastic cover is not deformed regardless of a material and thickness (thickness in the radial direction) of the plastic cover, whereby the above-mentioned problem does not occur. Accordingly, it is possible to freely set a material and shape (thickness) of the plastic cover in accordance with working conditions of the treatment device, regardless of strength of the plastic cover against the gas pressure.

In addition, the mechanical gas seal according to the aspect of the invention, which is composed of the static pressure type non-contact gas seal, can maintain the sealing end faces in the non-contact state by dynamic pressure generated by the dynamic pressure generating channel as well as static pressure caused by the seal gas. A seal function and contamination-prevention function can be obtained by the mechanical gas seal of the invention, under the condition that a seal function is not satisfactorily obtained by the conventional static pressure type non-contact gas seal (static pressure type non-contact gas seal for maintaining the sealing end faces in the non-contact state only by static pressure).

Figure 1:
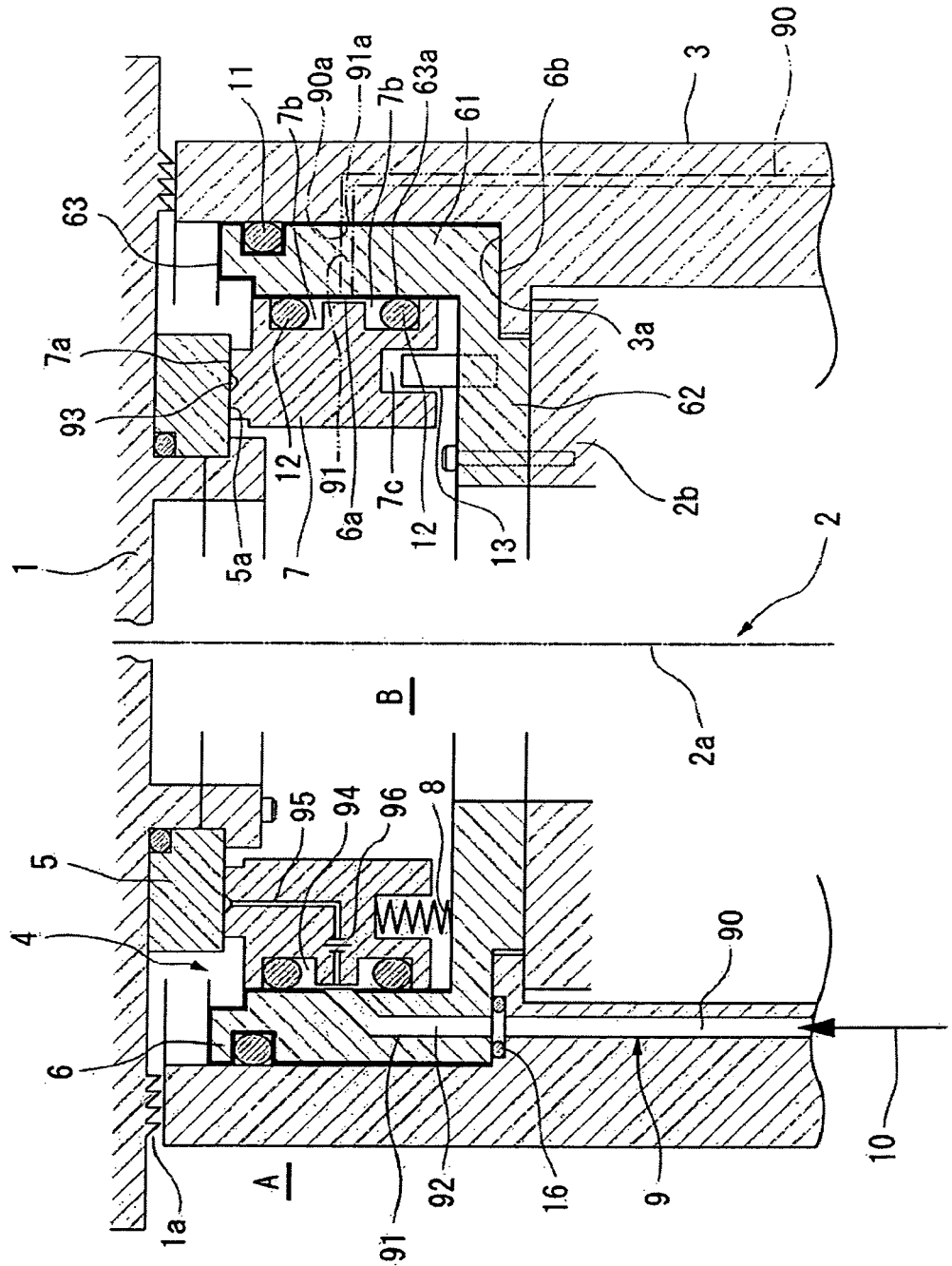
FIG. 1 is a front cross-sectional view showing an embodiment of a mechanical seal according to the invention.

REFERENCE NUMERALS 1 rotary table
2 driving unit
2a rotating shaft
2b supporting case
3 plastic cover
4 mechanical seal (static pressure type non-contact gas seal)
5 rotary sealing ring
5a sealing end face of rotary sealing ring
6 seal case
6a inner periphery of seal case
7 stationary sealing ring
7a sealing end face of stationary sealing ring
7b O-ring groove
8 spring member
9 seal gas passage
10 seal gas
12 O-ring
61 sealing ring holder
63 resin coating film
19 dynamic pressure generating channel
90 seal gas supply passage
91 seal gas ejecting passage
92 case-side passage
93 static pressure generating channel
94 communicating space
95 sealing ring-side passage
104 mechanical seal (complex non-contact gas seal)
A treatment area
B inside area of plastic cover (inside area of cover)

BEST MODE FOR CARRYING OUT THE INVENTION

Figure 2:
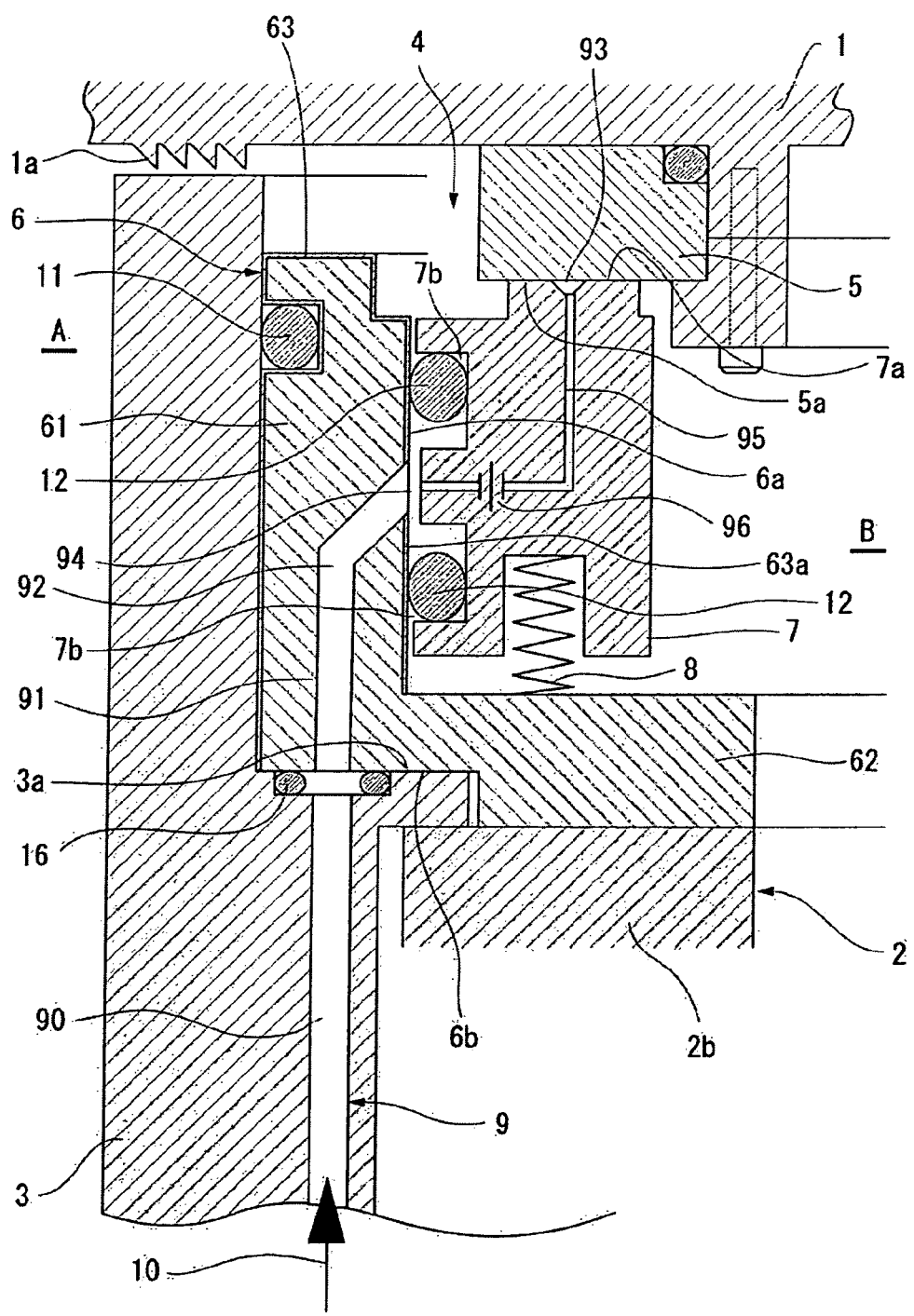
FIG. 2 is an enlarged view showing the main parts of FIG. 1.

FIG. 1 is a front cross-sectional view showing an embodiment of a treatment device having a mechanical seal 4 according to the invention, and FIG. 2 is an enlarged view showing the main parts thereof. In the treatment device, a driving unit 2 of a rotary table 1 is covered with the cylindrical plastic cover 3. When appropriate treatments (cleaning treatment, chemical treatment, and the like) are performed on substrates (which are objects to be treated, such as a semiconductor wafer, a substrate of an electronic device, a liquid crystal substrate, a photomask, a glass substrate, and the like) by using the rotary table 1, a treatment area A (a fluid sealed area) and an inside area B (which is an atmosphere area, and hereinafter referred to as a 'inside area of cover') of a plastic cover 3 (a fluid non-sealed area) in which the rotary table 1 is disposed are screened from each other by the mechanical seal 4 so that the treatment area A is kept clean.

In addition, the driving unit 2 includes a rotating shaft 2a that is connected to the rotary table 1 and extends in a vertical direction, bearings by which the rotating shaft 2a is rotatably supported, and a supporting case 2b that supports the bearings, the rotating shaft, and a driving means of the rotating shaft 2a in the inside area of the cover. The driving unit is configured so as to rotate the rotary table 1. The rotary table 1 is made of silicon carbide, is horizontally disposed in the treatment area, and is formed in the shape of a rotator such as a disc. In addition, as shown in FIG. 1, the plastic cover 3 is made of chemical resistant plastic (for example, PTFE), is integrally formed in the shape of a cylinder with an open upper end, and covers the driving unit 2 disposed on the lower side of the rotary table 1. If necessary, as shown in FIG. 1, a labyrinth seal 1*a* can be provided between the rotary table 1 and the plastic cover 3. If the labyrinth seal 1*a* is provided, it is possible to effectively prevent seal gas 10 to be described below from being ejected from the labyrinth seal 1*a* to the treatment area A, and thus to effectively prevent chemicals from entering from the treatment area A to the inside area B of the cover.

As shown in FIGS. 1 and 2, the mechanical seal 4 is a static pressure type non-contact mechanical seal. The mechanical seal includes a rotary sealing ring 5 fixed to the rotary table 1 to be coaxial with the rotary axis of the table; a cylindrical seal case 6 which is provided in the plastic cover 3 so as to be mounted on the supporting case 2*b*; a stationary sealing ring 7, which is held by means of a pair of O-rings 12 on an inner periphery of the seal case 6 (inner periphery of a sealing ring holder 61 to be described below) so as to move in an axial direction thereof in a state in which the stationary sealing ring directly faces the rotary sealing ring 5 so as to be concentric with the rotary sealing ring; a spring member 8, which is provided between the seal case 6 and the stationary sealing ring 7, and presses the stationary sealing ring 7 on the rotary sealing ring 5; an annular cover shoulder 3*a*, which is formed on the inner periphery of the plastic cover 3 and comes in contact with the end face 6*b* of the seal case 6 (lower end face of a sealing ring holder 61 to be described below); a successive seal gas passage 9, which passes through the plastic cover 3, the seal case 6, and the stationary sealing ring 7 and is open at a gap between the sealing end faces 5*a* and 7*a*. In this case, while keeping the sealing end faces 5*a* and 7*a* not to come in contact with each other by ejecting the seal gas 10 through the seal gas passage 9 to a gap between the sealing end faces 5*a* and 7*a*, the mechanical seal shields both of the areas A and B from each other.

As shown in FIGS. 1 and 2, the seal case 6 includes a cylindrical sealing ring holder 61 and an annular spring holder 62 extending inward from the lower side of the sealing ring holder, and is made of a metal (for example, a stainless steel such as an SUS316). The seal case 6 is mounted on the supporting case 2*b* with the spring holder 62 interposed between the seal case and the supporting case so that the lower end face 6*b* of the seal case 6 (lower end face of the sealing ring holder 61) comes in contact with the cover shoulder 3*a*, and so that the outer periphery thereof (outer periphery of the sealing ring holder 61) comes in close contact with the upper inner periphery of the plastic cover 3 (inner periphery above the cover shoulder 3*a*) with an O-ring 11 (which is made of fluorocarbon rubber) interposed therebetween.

The rotary sealing ring 5 is a ring-shaped body made of a harder material (for example, silicon carbide) than the material (for example, carbon) of the stationary sealing ring 7, and is fixed to the lower side of the rotary table 1 as shown in FIG. 1. The rotary sealing ring 5 has a flat and annular sealing end face (hereinafter, referred to as a 'rotary sealing end face') 5*a* on the lower surface thereof.

As shown in FIG. 1, the stationary sealing ring 7 is a ring-shaped body, which has a flat and annular sealing end face (hereinafter, referred to as a 'stationary sealing end face') 7*a* on the upper surface thereof. The stationary sealing ring is fitted and held on the inner periphery 6*a* of the sealing ring holder 61 of the seal case 6 with the pair of O-rings 12 and 12 (which is made of fluorocarbon rubber, and is arranged in the vertical direction) interposed therebetween so as to move in the axial direction thereof. An outer diameter of the stationary sealing end face 7*a* is set slightly smaller than that of the rotary sealing end face 5*a*, and an inner diameter of the stationary sealing end face 7*a* is set slightly larger than that of the rotary sealing end face 5*a*. The O-rings 12 are is fitted and held in annular O-ring grooves 7*b*, respectively, which are formed on the outer periphery of the stationary sealing ring 7, in a state in which the O-rings comes in press contact with the inner periphery of the seal case 6. Accordingly, while allowing the stationary sealing ring 7 to move in the axial direction of the stationary sealing ring 7, the O-rings secondarily seals a gap between the stationary sealing ring 7 and the seal case 6. In addition, a circular hole 7*c* extending in the axial direction is formed on the lower surface of the stationary sealing ring 7. When a drive pin 13, which is fixed to the spring holder 62 of the seal case 6 and made of a metal (for example, a stainless steel such as an SUS316), is inserted into the circular hole 7*c*, the stationary sealing ring 7 cannot be rotated relative to the seal case 6 while the stationary sealing ring 7 moves in the axial direction thereof. Furthermore, the numbers of the circular hole 7*c* and the drive pin 13 inserted thereinto are not limited, and a plurality of holes and drive pins may be provided if necessary.

As shown in FIG. 1, the spring member 8 is composed of a plurality of coil springs (only one spring is shown), which are provided between the stationary sealing ring 7 and the spring holder 62 disposed below the stationary sealing ring, and presses the stationary sealing ring 7 on the rotary sealing ring 5. Furthermore, the spring member generates a closing force that acts in a direction of closing the gap between the sealing end faces 5*a* and 7*a*.

As shown in FIGS. 1 and 2, the seal gas passage includes a seal gas supply passage 90 formed in the plastic cover 3, and a successive seal gas ejecting passage 91 formed in the seal case 6 and the stationary sealing ring 7. The seal gas ejecting passage 91 includes a case-side passage 92 formed in the seal case 6; a static pressure generating channel 93 formed on the stationary sealing end face 7*a*; an annular communicating space 94, which is formed between the opposite peripheries of the stationary sealing ring 7 and the seal case 6 and is sealed by the O-rings 12 and 12; and a sealing ring-side passage 95 penetrating the stationary sealing ring 7 to reach the static pressure generating channel 93 from the communicating space 94.

As shown in FIG. 1, the seal gas supply passage 90 penetrates the plastic cover 3 in the vertical direction (in the axial direction of the plastic cover 3) so that the upper end (downstream end) of the seal gas supply passage is open at the cover shoulder 3*a* and the lower end (upstream end) of the seal gas supply passage is connected to the proper seal gas supply line (not shown).

As shown in FIG. 1, the case-side passage 92 penetrates the sealing ring holder 61 from the lower side sealing ring holder to the inner periphery 6*a* so as to be connected to the seal gas supply passage 90 and the communicating space 94. The upstream end of the case-side passage 92 and the downstream end of the seal gas supply passage 90 are connected to each other so that a gap therebetween is sealed by an O-ring 16. The O-ring 16 is made of fluorocarbon rubber and provided between the cover shoulder 3*a* and the seal case end face 6*b*.

Figure 3:
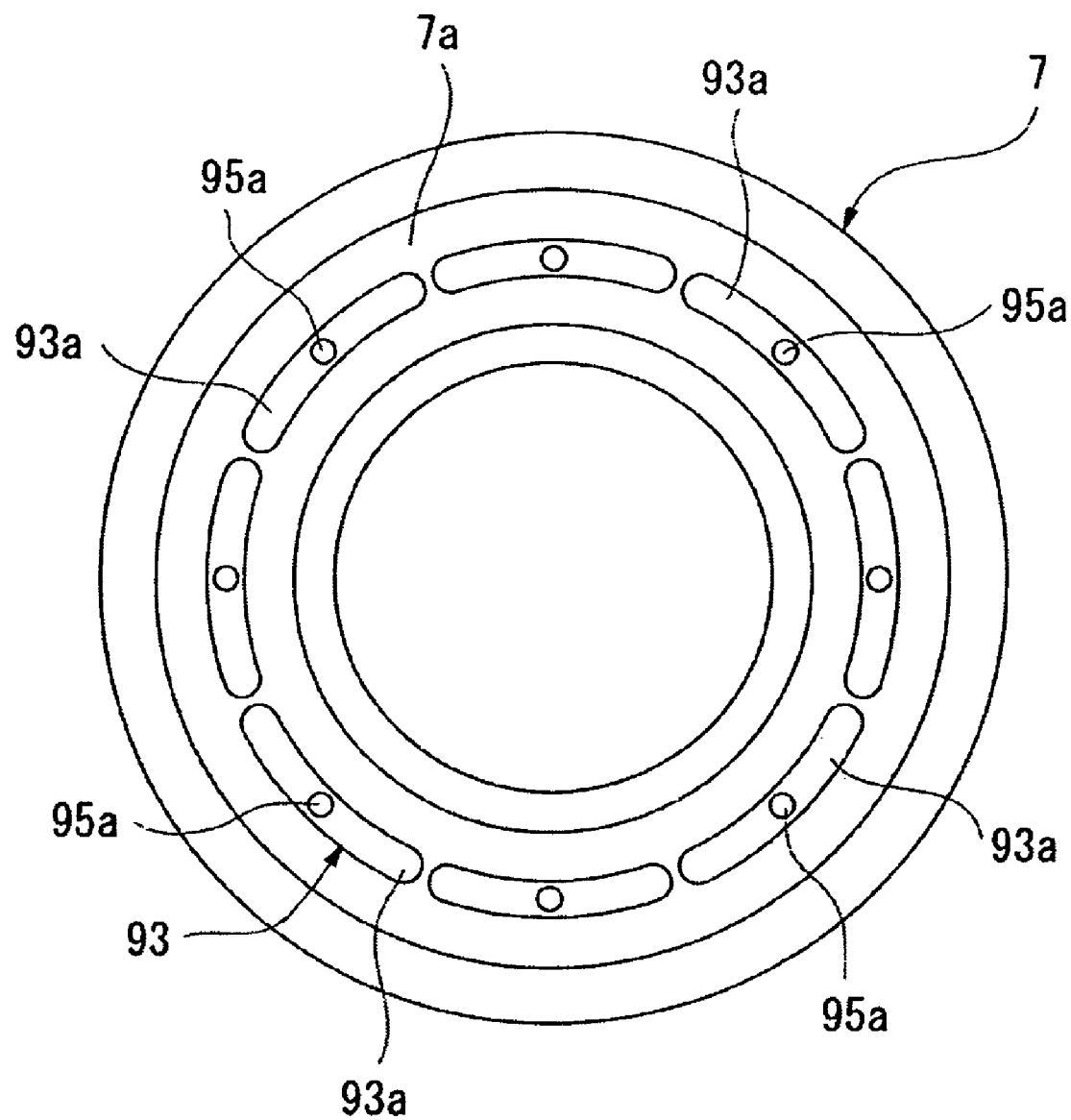
FIG. 3 is a plan view showing a stationary sealing ring of the mechanical seal.

The static pressure generating channel 93 is a shallow channel, which has an annular and continuous or intermittent shape so as to be concentric with the stationary sealing end face 7*a*. The following channel (intermittent channel) is adopted as an example of the static pressure generating channel. That is, as shown in FIG. 3, the static pressure generating channel 93 includes a plurality of arc channels 93*a*, which stands in line so as to be concentric with the stationary sealing end face 7a. The vertical width (a distance between the O-rings 12 and 12) of the communicating space 94 is set depending on a displacement in the axial direction (vertical direction), which is required to secure the following ness of the stationary sealing ring 7. Even though the stationary sealing ring 7 moves, the case-side passage 92 and the communicating space 94 are not disconnected from each other. In addition, one end (upstream end) of the sealing ring-side passage 95 is open at the outer periphery of the stationary sealing ring 7 between the O-rings 7a and 7b (is open at the communicating space 94). Furthermore, the other end (downstream end) thereof branches off at a plurality of branches 95a so that each of the branches 95a is open at the arc channels 93a constituting the static pressure generating channel 93 as shown in FIG. 3. In addition, a proper throttling unit 96 (having a throttling function of an orifice, a capillary tube, a porous member, or the like) is provided at a proper position (for example, an upstream position of the branches 95a, which are properly provided on the sealing ring-side passage 95) on the seal gas passage 9. Accordingly, even though the distance between the sealing end faces 5a and 7a is varied, the distance therebetween is automatically adjusted and properly held. That is, when the distance between the sealing end faces 5a and 7a increases due to the vibration of the rotary device (rotary table 1), the amount of seal gas ejected from the static pressure generating channel 93 through the gap between the sealing end faces 5a and 7a becomes unbalanced with that of seal gas supplied to the static pressure generating channel 93 through the throttling unit 96. As a result, the pressure in the static pressure generating channel 93 decreases, and an opening force caused by the seal gas 10 becomes smaller than a closing force caused by the spring member 8. Accordingly, the distance between the sealing end faces 5a and 7a decreases so that the gap therebetween is properly adjusted. In contrast, when the distance between the sealing end faces 5a and 7a decreases, the pressure in the static pressure generating channel 93 increases due to the above-mentioned throttling function of the throttling unit 96, and the opening force becomes larger than the closing force. Accordingly, the distance between the sealing end faces 5a and 7a increases so that the gap therebetween is properly adjusted.

Clean seal gas 10, which has higher pressure and less particles than those of both areas A and B, is supplied to the static pressure generating channel 93 through the seal gas passage 9 (the seal gas supply passage 90, the case-side passage 92, the communicating space 94, and sealing ring-side passage 95). Gas, which has no bad effect even when being flown out to each area A and B, is properly selected as the seal gas 10 depending on sealing conditions. In the embodiment, clean nitrogen, which has inert effect on various materials and is harmless to humans, is used as the seal gas. Furthermore, the seal gas 10 is generally supplied during the operation of the rotary table 1 (driving of the rotating shaft 2a), and the supply of the seal gas stops after stop of the operation. After the seal gas 10 begins to be supplied and the distance between the sealing end faces 5a and 7a is held in a proper non-contact state, the rotary table 1 begins to be operated. Furthermore, after the rotary table 1 is stopped and the rotating shaft 2a is completely stopped, the supply of the seal gas 10 stops. Moreover, if necessary, the seal gas 10 can be always or intermittently supplied regardless of whether the rotary table 1 is operated.

When the seal gas 10 is supplied to the static pressure generating channel 93, the opening force, which acts in a direction of opening the gap between the sealing end faces 5a and 7a, is generated between the sealing end faces 5a and 7a. The opening force is caused by a static pressure, which is generated by the seal gas 10 supplied to the gap between the sealing end faces 5a and 7a. Accordingly, the sealing end faces 5a and 7a are held in a non-state state in which the opening force and the closing force (spring load) are balanced against each other. The closing force is generated by the spring member 8, and acts in the direction of closing the gap between the sealing end faces 5a and 7a. That is, the seal gas 10 supplied to the static pressure generating channel 93 forms a fluid film having static pressure between the sealing end faces 5a and 7a, and the fluid film shields the outer peripheral area (treatment area) A of the sealing end faces 5a and 7a from the inner peripheral area (inside area of cover) B thereof. The pressure of the seal gas 10 and the spring force (spring load) of the spring member 8 are properly set depending on the sealing conditions so that the distance between the sealing end faces 5a and 7a is proper (in general, 5 to 15 µm).

However, the stationary sealing ring 7 moves in the axial direction due to the supply of the seal gas 10, stop thereof, or the adjustment of the gap by the throttling unit 96. Then, when the stationary sealing ring moves satisfactorily and smoothly, a proper sealing function can be obtained by the mechanical seal. As a result, when the O-rings 12 and 12, which are fitted and held on stationary sealing ring 7, smoothly and relatively move (slide) on the inner periphery 6a of the seal case 6, the following ness of the stationary sealing ring 7 is secured. However, the seal case 6 is made of a metal, a friction coefficient between the inner periphery 6a of the seal case and the O-rings 12 and 12 made of fluorocarbon rubber is large, and the O-rings 12 and 12 are compressed between the seal case 6 and the stationary sealing ring 7 on which the secondary sealing function of the O-rings acts. As a result, the O-rings 12 and 12 are comes in press contact with the inner periphery 6a of the seal case 6. Accordingly, the O-rings 12 and 12 are difficult to move in accordance with the movement of the stationary sealing ring 7, whereby there has been a possibility that the following ness of the stationary sealing ring 7 deteriorate.

As shown in FIG. 2, in the mechanical seal 4 of the invention, a low-friction resin coating film 63 is formed on the inner periphery of the sealing ring holder 61, on which the O-rings 12 and 12 slide, so that the O-rings 12 and 12 can smoothly slide and the following ness of the stationary sealing ring 7 is improved.

In addition, in the embodiment, the resin coating film 63 is formed on a portion of the seal case, with which the sealed fluid comes in contact (or may come in contact), as well as on the portion 6a of the seal case, on which the O-rings 12 and 12 come in contact with and slide. That is, as shown in FIG. 2, the successive resin coating film 63 is formed on the surface of the sealing ring holder 61 of the seal case 6 so that the sealed fluid does not directly comes in contact with the metal portion of the seal case 6. In this way, it is possible to prevent metal ions, which are generated by contacting the sealed fluid with the seal case 6 made of a metal, from being generated. Therefore, it is possible to prevent the treatment at the treatment area A from being poor due to the metal ions. In addition, among components of the treatment device and the mechanical seal 4 provided to the treatment device, a member coming contact with the sealed fluid is made of a non-metal material, which does not completely generate metal ions, by removing the seal case 6 therefrom, or is coated with a non-metal material. That is, the rotary sealing ring 5 is made of silicon carbide, the stationary sealing ring 7 is made of carbon, and each of O-rings 11, 12, and 16 is made of fluorocarbon rubber. Furthermore, the rotary table 1 and the cover 3 are also made of a non-metal material such as PTFE or the like, or portions coming contact with portions thereof, faces the treatment area A, are coated with a resin such as PTFE or the like. Meanwhile, all of the spring members 8 made of a metal and the drive pin 13, which are made of a metal, are disposed in the inside area B of the cover. Accordingly, even when an object to be treated is a material, which should be protected from metal ions, such as a semiconductor wafer, it is possible to satisfactorily treat the object.

Meanwhile, a low-friction plastic such as fluorocarbon polymer, which has a low friction coefficient between the O-rings 12 and the resin coating film, is preferably used as a material of the resin coating film 63, and for example, PTFE is used as a material of the resin coating film.

In addition, the resin coating film 63 preferably has a thickness in the range of 5 to 100 μm, and optimally has a thickness in the range of 20 to 40 μm. If the resin coating film has the above-mentioned thickness, it is possible to obtain a constant thickness of the resin coating film without thickness deviation thereof. As a result, since the deviation of the contact resistance between the O-rings 12 and the resin coating film decreases, it is possible to considerably improve the following ness of the stationary sealing ring 7. Furthermore, the surface of the resin coating film 63, particularly the surface of a portion 63a with which the O-rings 12 and 12 come in contact, is preferably machined to be a smooth surface with high accuracy.

Meanwhile, for example, as shown by a two-dot chain line in FIG. 1, in the seal gas passage 9, the downstream end 90a of the seal gas supply passage 90 is open at the inner periphery of the plastic cover 3, and the upstream end 91a of the seal gas ejecting passage 91 is open at the outer periphery of the seal case 6 so that both of the open ends 90a and 91a are connected to each other. However, since the pressure caused by the high-pressure seal gas 10 is applied to the communicating portion between the open ends 90a and 91a, the plastic cover 3 is deformed in the radial direction. As a result, since the sealing function deteriorates or is lost at the communicating portion between the open ends 90a and 91a, there has a possibility that the seal gas is not smoothly supplied.

However, in the mechanical seal 4, the seal gas supply passage 90 formed in the plastic cover 3 and the seal gas ejecting passage (case-side passage 92) formed in the seal case 6 are connected to each other at the portion at which the cover shoulder 3a and the seal case end face 6b comes in contact with each other so that the gas flows from the seal gas supply passage 90 to the seal gas ejecting passage 91 in the axial direction of the plastic cover 3. As a result, the plastic cover 3 is not deformed in the radial direction due to the pressure of the seal gas 10, regardless of a material and thickness (thickness in the radial direction) of the plastic cover 3. Therefore, it is possible to freely set a material and shape (thickness) of the plastic cover 3 in accordance with working conditions of the treatment device, regardless of strength of the plastic cover against the pressure of the seal gas 10. In addition, when the above-mentioned labyrinth seal 1a is provided between the cover 3 and the rotary table 1, the plastic cover 3 is not deformed. Accordingly, the function of the labyrinth seal 1a does not deteriorate.

Furthermore, the structure of the invention is not limited the above-mentioned embodiment, and the invention can have proper modifications and variations without departing from the scope of the invention.

Figure 4:
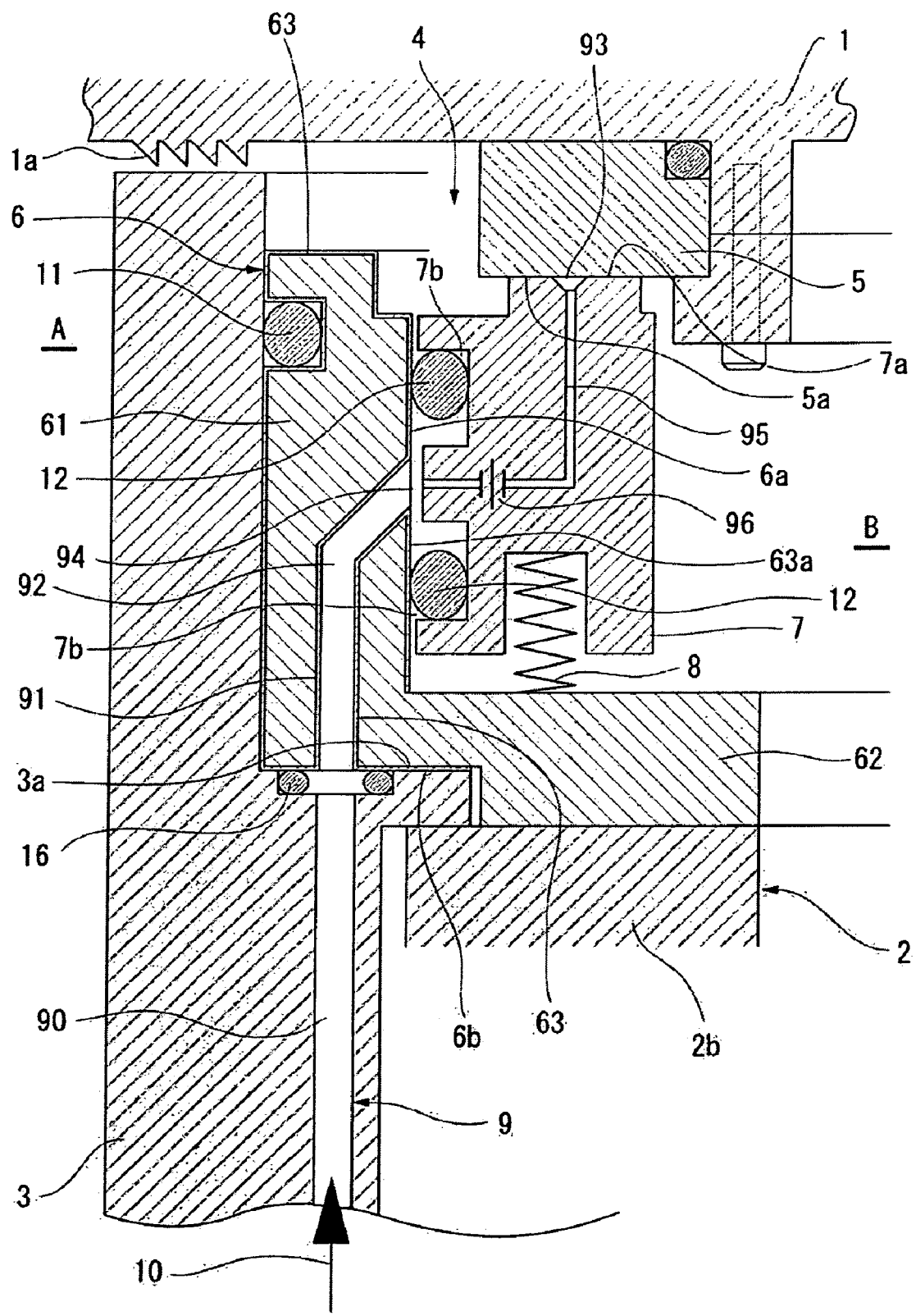
FIG. 4 is a front cross-sectional view, which corresponds to FIG. 2, showing a first modification of the mechanical seal according to the invention.

For example, in the mechanical seal 4 show in FIGS. 1 and 2, the resin coating film 63 is formed on the portion 6a of the seal case, with which the sealed fluid comes in contact (or may come in contact), as well as on the portion of the seal case, on which the O-rings 12 and 12 come in contact with and slide. However, in addition to the portions of the seal case, the resin coating film may be also formed on the portion of the seal case, with which the seal gas 10 comes in contact (or may come in contact). That is, as shown in FIG. 4, the successive resin coating film 63 is formed on the surface of the sealing ring holder 61 of the seal case 6 and the inner surface of the sealing ring-side passage 95 so that the sealed fluid and seal gas 10 does not directly come in contact with the metal portion of the seal case 6. In this way, it is possible to prevent metal ions, which are generated by contacting the sealed fluid and seal gas 10 with the seal case 6 made of a metal, from being generated. Therefore, it is possible to prevent the treatment at the treatment area A from being poor due to the metal ions.

Figure 5:
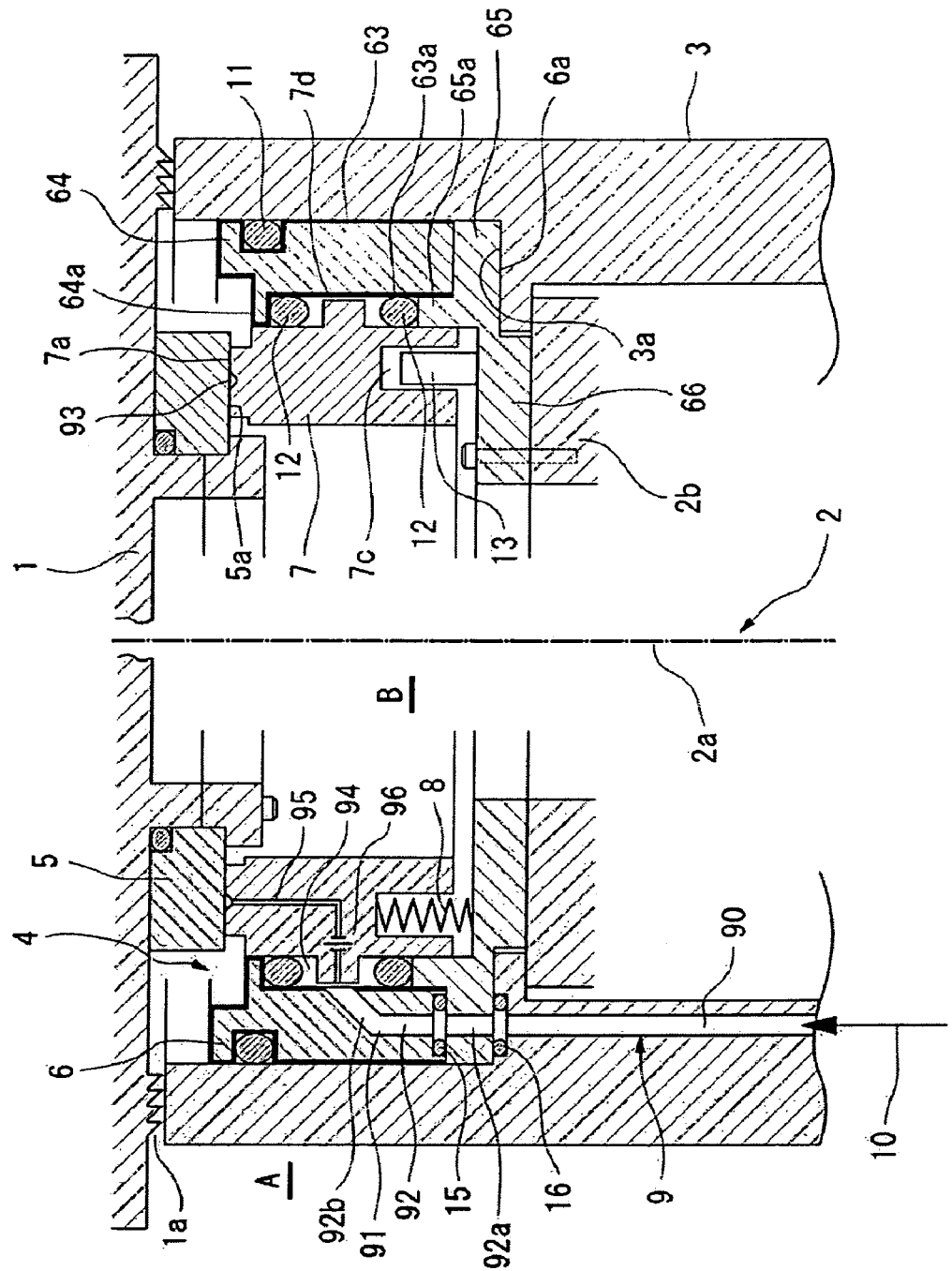
FIG. 5 is a front cross-sectional view, which corresponds to FIG. 1, showing a second modification of the mechanical seal according to the invention.
Figure 6:
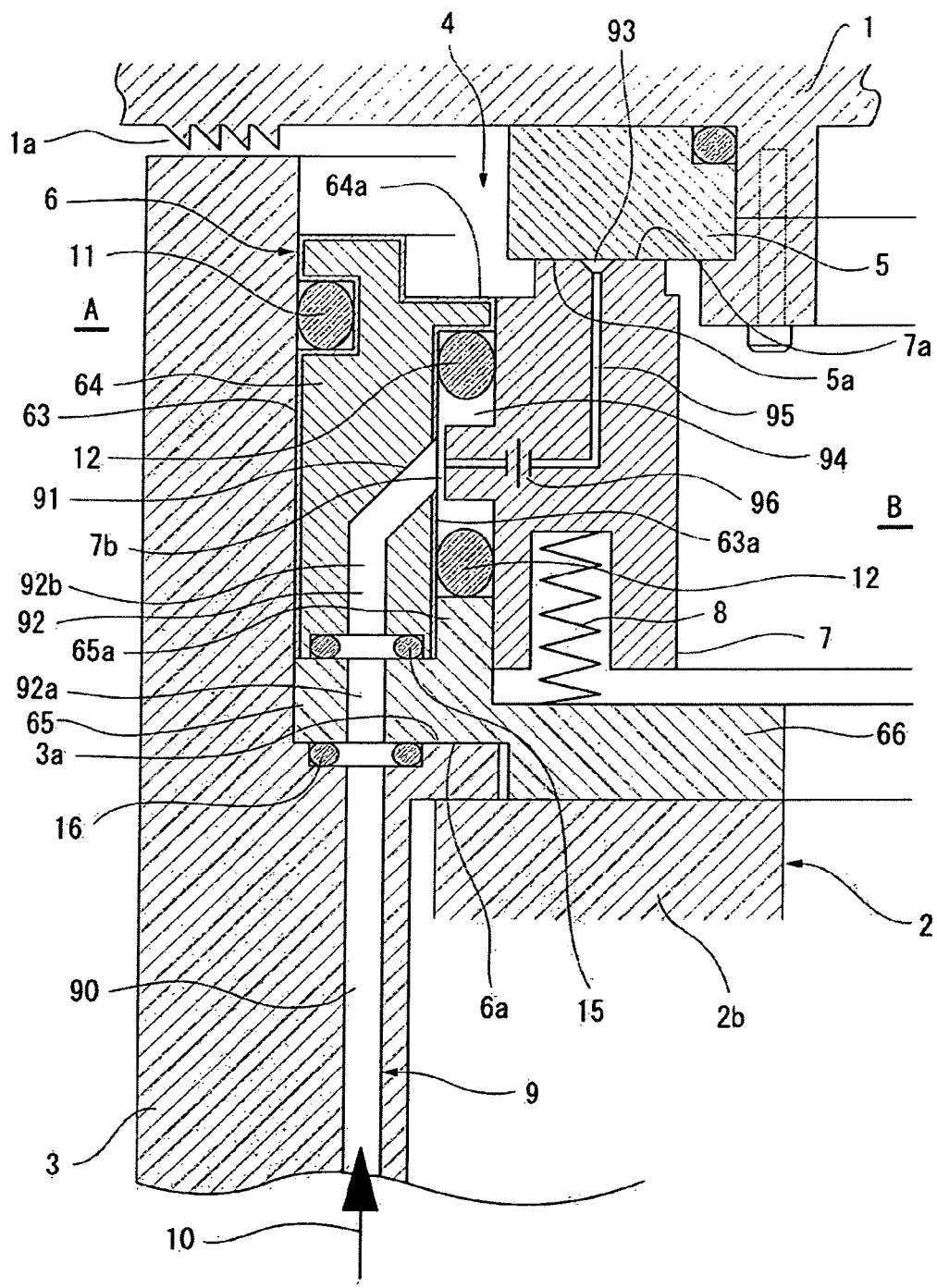
FIG. 6 is an enlarged view showing the main parts of FIG. 5.

Moreover, although the seal case 6 is formed as one component in the mechanical seal 4 shown in FIG. 1 or 4, the seal case 6 can be composed of a plurality of components made of metal. For example, as shown in FIGS. 5 and 6, the seal case 6 can be composed of a cylindrical upper body 64, and lower bodies 65 and 66. The lower bodies includes a cylindrical sealing ring holder 65 and an annular spring holder 66 extending inward from the lower side of the sealing ring holder. The upper body 64 and the lower bodies 65 and 66 are connected to one another by proper connectors. The seal case 6 is mounted on the supporting case 2b with the spring holder 62 interposed between the seal case and the supporting so that the lower end face 6a of the seal case 6 (lower end face of the sealing ring holder 65) comes in contact with the cover shoulder 3a, and so that the outer periphery thereof (outer periphery of the upper body 64) comes in close contact with the upper inner periphery of the plastic cover 3 (inner periphery above the cover shoulder 3a) by means of an O-ring 11 (which is made of fluorocarbon rubber). The O-rings 12 and 12 are provided in annular spaces. The annular spaces are formed between an annular protrusion 7d that is formed on the outer periphery of the stationary sealing ring 7, and annular protrusions 64a and 65a that are formed on the upper body 64 and the sealing ring holder 65, respectively, so as to face each other on the upper and lower sides of the annular protrusion 7d. In addition, a circular hole 7c extending in the axial direction is formed on the lower surface of the stationary sealing ring 7. When a drive pin 13, which is fixed to the spring holder 66 of the seal case 6 and made of a metal (for example, a stainless steel such as an SUS316), is inserted into the circular hole 7c, the stationary sealing ring 7 cannot be rotated relative to the seal case 6 while the stationary sealing ring 7 moves in the axial direction thereof. The case-side passage 92 includes a first gas passage 92a, which penetrates the sealing ring holder 65 in the axial direction thereof, and a second gas passage 92b, which penetrates the upper body 64 from the lower end thereof to the inner periphery thereof. The upper end of the first gas passage 92a and the lower end of the second gas passage 92b are connected to each other so that a gap therebetween is sealed by an O-ring 15. The O-ring 15 is made of fluorocarbon rubber and provided at the contact portion between the upper body 64 and the sealing ring holder 65. The upper end (downstream end) of the second gas passage 92b is connected to the communicating space 94. The lower end (upstream end) of the first gas passage 92a directly faces the upper opening (downstream opening) of the seal gas supply passage 90, and is open at the seal case end face 6a. Furthermore, the seal gas supply passage 90 and the first gas passage 92a are connected to each other so that a gap therebetween is sealed by an O-ring 16. The O-ring 16 is made of fluorocarbon rubber and provided between the cover shoulder 3a and the seal case end face 6a.

Figure 7:
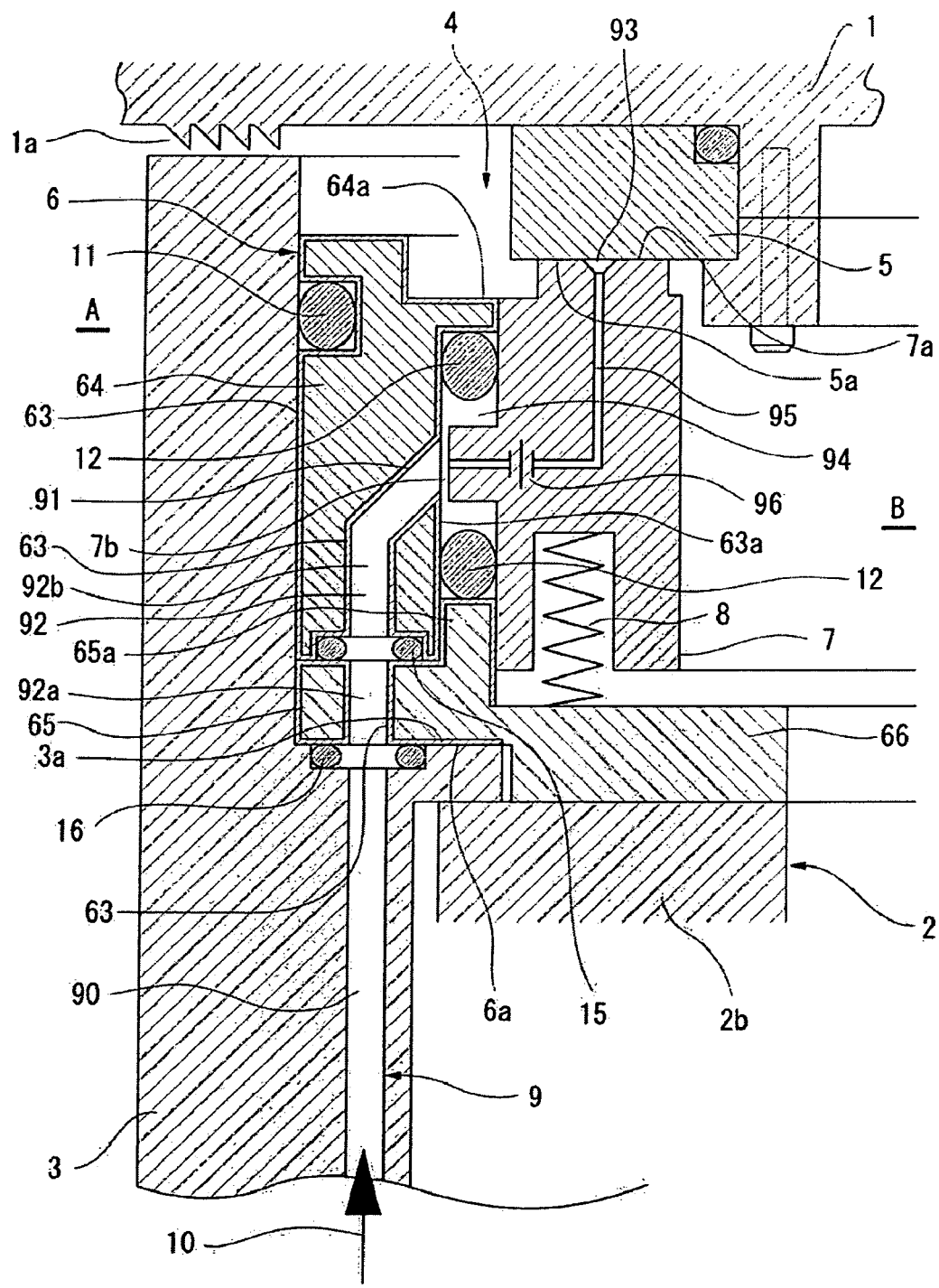
FIG. 7 is a front cross-sectional view, which corresponds to FIG. 6, showing a third modification of the mechanical seal according to the invention.

Even though the seal case 6 is formed as several divided components, the resin coating film 63 is formed on the portion of the seal case, on which the O-rings 12 and 12 come in contact with and slide, and on the portion of the seal case, with which the sealed fluid comes in contact, that is, on the surface of the upper body 64, as shown in FIGS. 5 and 6. If necessary, as shown in FIG. 7, the resin coating film 63 can be formed on the portion of the seal case, with which the seal gas 10 comes in contact, that is, on the inner periphery of the case-side passage 92 and the surface of the sealing ring holder 65.

The invention can be also applied to an end face contact type mechanical seal, in which both sealing rings are rotated and slide relative to each other. However, the invention can be more preferably applied to a non-contact mechanical gas seal (the above-mentioned static pressure type non-contact gas seal or a dynamic pressure type non-contact mechanical seal in which a dynamic pressure generating channel is formed on one sealing end face to generate dynamic pressure and sealing end faces are maintained in a non-contact state by dynamic pressure generated in the channels) of which following ness is emphasized.

Figure 8:
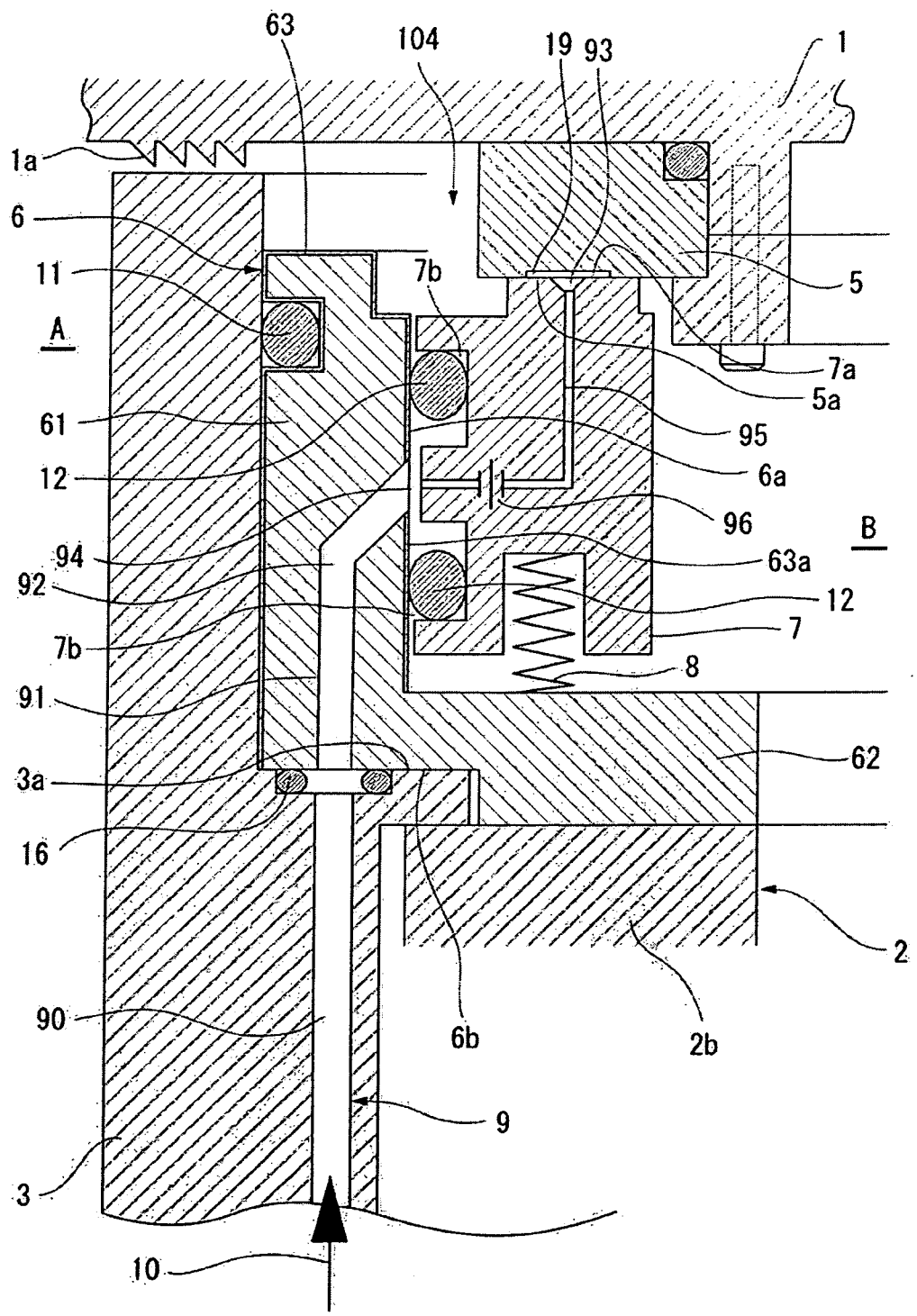
FIG. 8 is a front cross-sectional view, which corresponds to FIG. 2, showing a fourth modification of the mechanical seal according to the invention.
Figure 9:
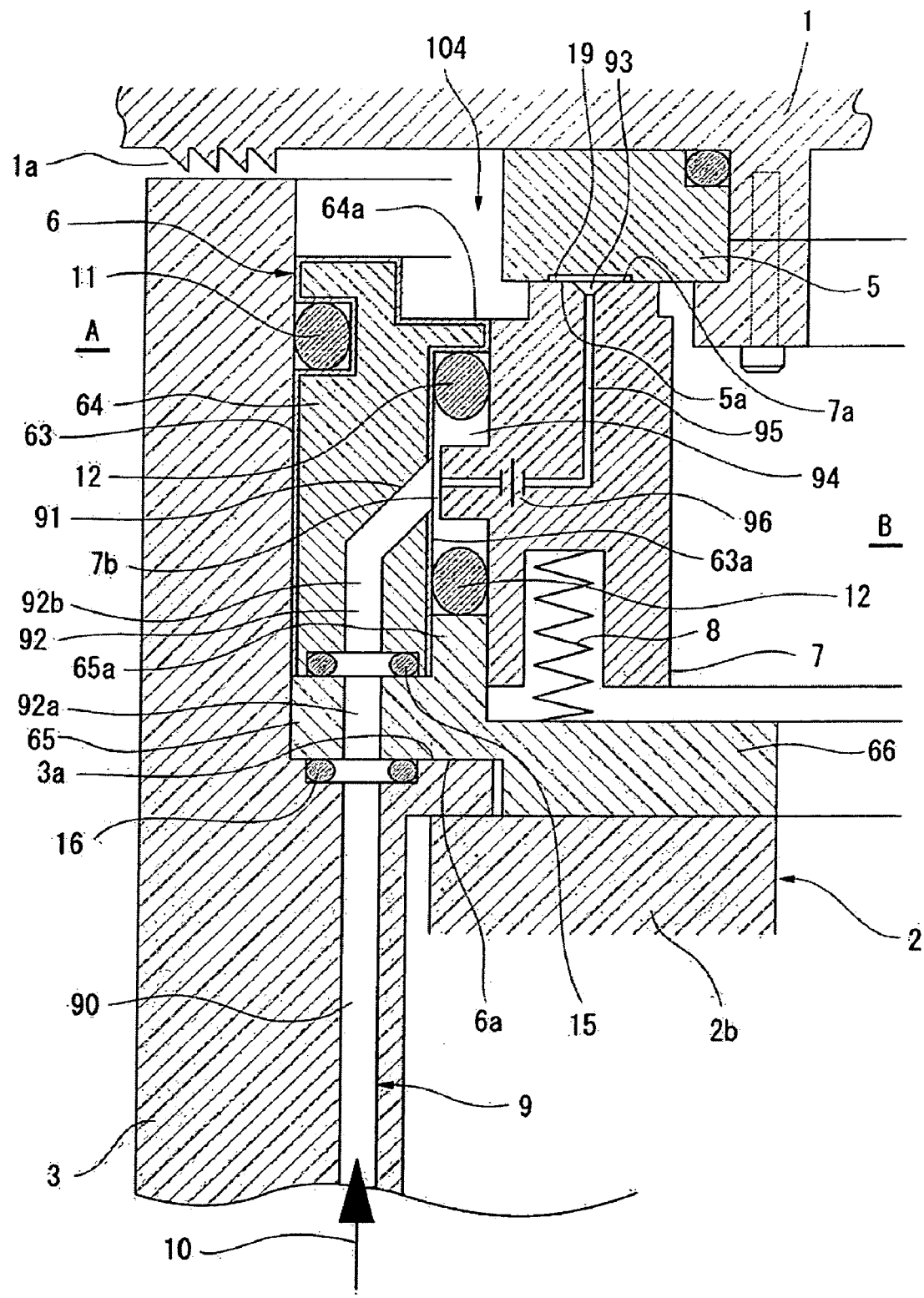
FIG. 9 is a longitudinal elevation view, which corresponds to FIG. 6, showing a fifth modification of the mechanical seal according to the invention.

Furthermore, the mechanical seal shown in FIGS. 1, 4, 5, or 7 is composed of a static pressure type non-contact gas seal 4 in which the sealing end faces 5*a* and 7*a* are maintained in the non-contact state only by the static pressure caused by the seal gas 10. However, as shown in FIGS. 8 and 9, the mechanical seal of the invention can be composed of a complex non-contact gas seal 104 in which the sealing end faces 5*a* and 7*a* are maintained in the non-contact state by generating dynamic pressure as well as static pressure. Whether the following ness of the stationary sealing ring 7 is satisfactory is considered as an important factor in the function of the complex non-contact gas seal 104.

Figure 10:
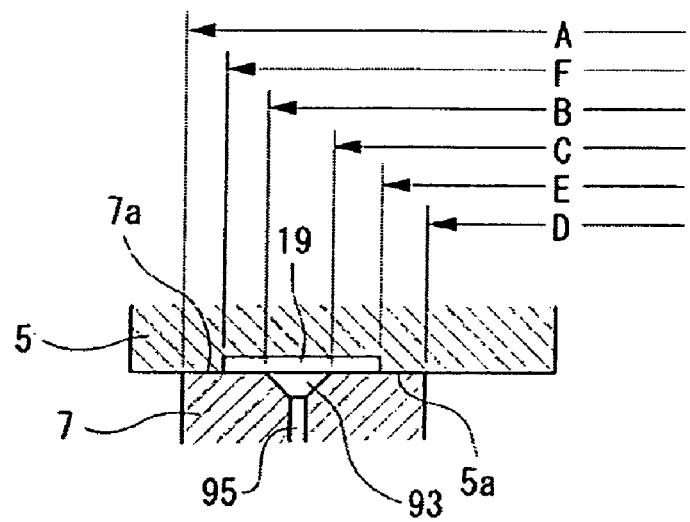
FIG. 10 is an enlarged view showing the main parts of FIG. 8 or 9.
Figure 11:
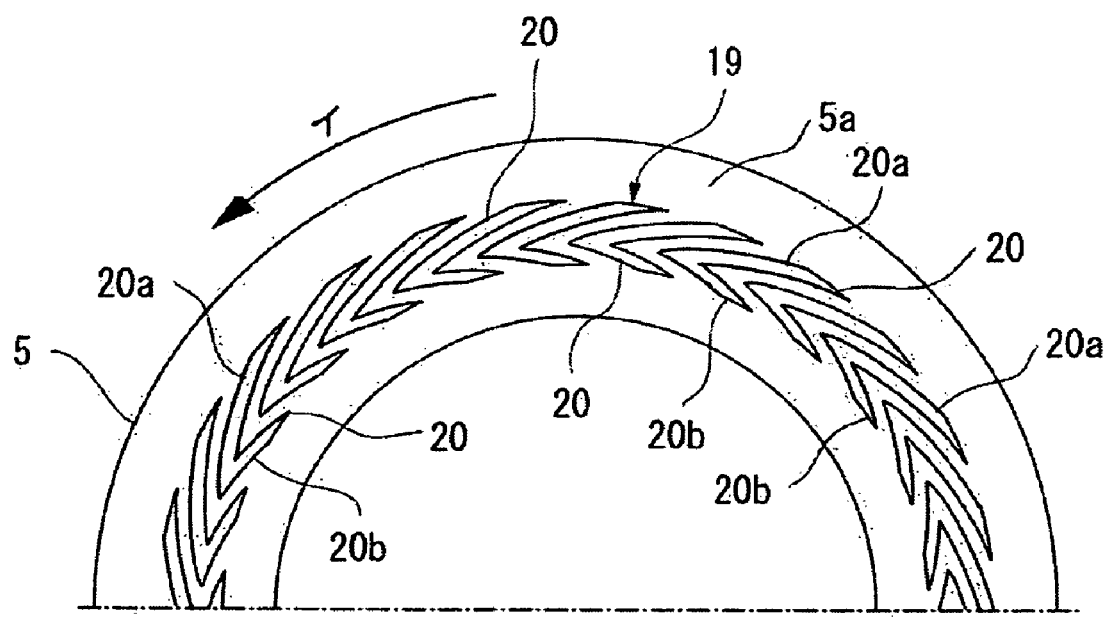
FIG. 11 is a plan view, which shows a half of the rotary sealing ring, showing an embodiment of a dynamic pressure generating channel of the mechanical seal (complex non-contact gas seal) shown in FIG. 8 or 9.
Figure 12:
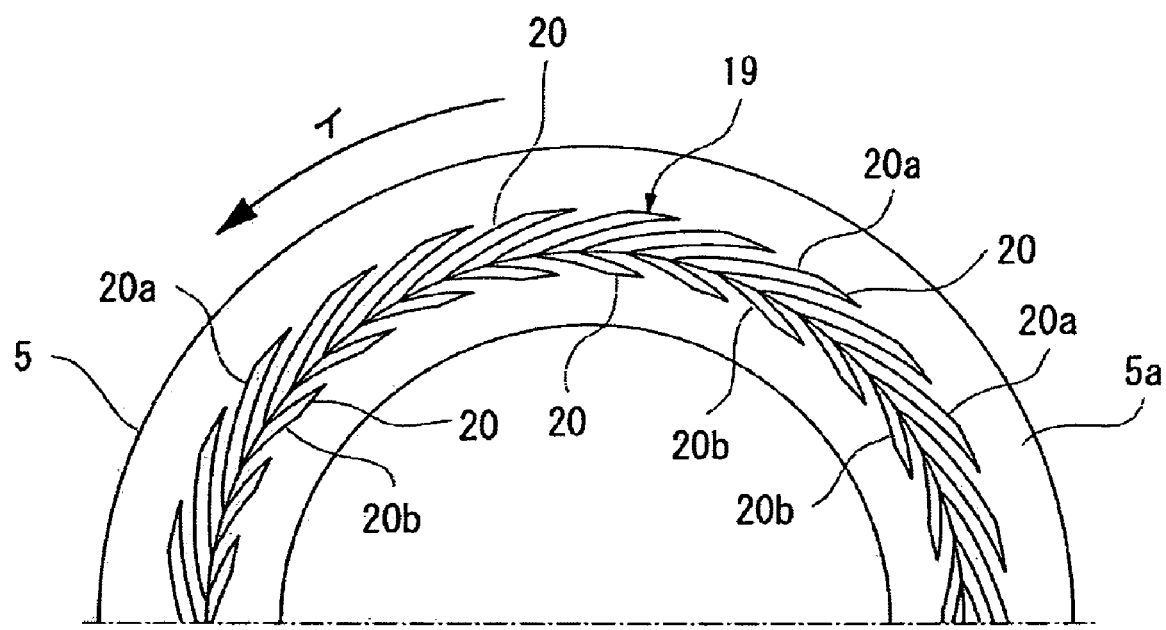
FIG. 12 is a plan view, which shows a half of the rotary sealing ring, showing a modification of the dynamic pressure generating channel in the mechanical seal (complex non-contact gas seal) shown in FIG. 8 or 9.

That is, in the complex non-contact gas seal 104 shown in FIG. 8 or 9, a dynamic pressure generating channel is formed on the sealing end face 5*a* (rotary sealing end face, that is, one sealing end face) of the rotary sealing ring 5 to generate dynamic pressure between the sealing end faces 5*a* and 7*a*. It is possible to properly set the shape of the dynamic pressure generating channel 19 in accordance with sealing conditions. However, the dynamic pressure generating channel 19 of this embodiment includes a plurality of grooves 20, which stands in line in the circumferential direction of the sealing end face 5*a*, as shown in FIG. 11 or 12. Each of the grooves 20 has a first groove part 20*a* and a second groove part 20*b*. The first groove part 20*a* is inclined and extends outward in the radial direction and the reverse direction of the rotation direction (direction indicated by an arrow) of the rotary sealing ring 5 from the portion facing the static pressure generating channel 93 on the rotary sealing end face 5*a*. The second groove part 20*b* is inclined and extends inward in the radial direction and the reverse direction of the rotation direction (direction indicated by an arrow) of the rotary sealing ring 5 from the portion. Each of the grooves 20 is a groove that has a constant and shallow depth in the range of 1 to 10 μm. The outermost end (outer end of the first groove part 20*a*) and the inmost end (inner end of the second groove part 20*b*) are positioned in the overlapped area in which the sealing end faces 5*a* and 7*a* are overlapped each other. That is, as shown in FIG. 10, the inner and outer diameters E and F of the dynamic pressure generating channel 19 are properly set in the range, which satisfies relations of B<F<A and D<E<C, with respect to the outer diameter (≦the outer diameter of the rotary sealing end face 5*a*) A of the sealing end face (stationary sealing end face) 7*a* of the stationary sealing ring 7, the inner diameter thereof (≧the inner diameter of the rotary sealing end face 5*a*) D, and the outer and inner diameters B and C of the static pressure generating channel 93 (arc channels 93*a*). In this embodiment, the inner and outer diameters E and F are set so as to satisfy a relation of 0.5≦(F−B)/(A−B)≦0.9 or 0.5≦(C−E)/(C−BD)≦0.9. As shown in FIG. 11, each of the grooves 20 is formed in a substantial V shape in which the first groove part 20*a* and the second groove part 20*b* are connected to each other at a base part, or as shown in FIG. 12, each of the grooves is formed in a zigzag shape in which the base parts of the first groove part 20*a* and the second groove part 20*b* alternate each other in the circumferential direction of the rotary sealing ring. Furthermore, other configurations of the complex non-contact gas seal 104 except for the above-mentioned configuration are the same as those of the static pressure type non-contact gas seal 4 shown in FIGS. 1, 4, 5, or 7.

According to the complex non-contact gas seal 104, dynamic pressure is generated by the dynamic pressure generating channel 19 as well as static pressure is generated by the seal gas 10 between the sealing end faces 5*a* and 7*a*, and the sealing end faces 5*a* and 7*a* are maintained in the non-contact state by the static pressure and dynamic pressure. Accordingly, even when the sealing end faces 5*a* and 7*a* cannot be maintained in the proper non-contact state by the static pressure and dynamic pressure, the sealing end faces can be maintained in the proper non-contact state by the dynamic pressure. In addition, when the mechanical seal of the invention is compared to the static pressure type non-contact gas seal for maintaining the non-contact state only by the static pressure, the mechanical seal of the invention can reduce required amount of the seal gas 10 to be supplied by means of the static pressure caused by the seal gas 10. Furthermore, the dynamic pressure generating channel 19 is not open on the outside of the overlapped area. Accordingly, the outermost end and the inmost end of each groove 20 serve as weirs for the seal gas 10, which is supplied to the gap between the sealing end faces 5*a* and 7*a*, and function to narrow a leak gap between the sealing end faces 5*a* and 7*a*. As a result, since the leakage of the seal gas 10, which is supplied to the gap between the sealing end faces 5*a* and 7*a*, to be leaked to the treatment area (a fluid sealed area) A is suppressed, the dynamic pressure generating channel 19 can very satisfactorily collect the seal gas 10. Therefore, it is possible to reduce consumption of the seal gas 10. Even if there are particles accompanied with the seal gas 10, it is possible to suppress the infiltration of the particles as much as possible. Furthermore, the rotary table 1 or rotating shaft 2*a* are may be rotated not in one direction but in the normal and reverse directions, depending on the configuration and working conditions of the treatment device that includes the complex non-contact gas seal 104. However, in this case, the dynamic pressure generating channel 19 may be configured so that the dynamic pressure is generated even though the rotary sealing ring 5 is rotated in one direction of the normal and reverse directions. The dynamic pressure generating channel 19 can be set to have any shape in accordance with sealing conditions or the like, and various shapes have been proposed for the dynamic pressure generating channel in the related art. For example, a plurality of pairs of dynamic pressure generating channel units is formed on the rotary sealing end face 5*a* so as to stand in line in the circumferential direction of the rotary sealing end face at a predetermined interval. Each of the dynamic pressure generating channel units includes a first dynamic pressure generating channel and a second dynamic pressure generating channel, which are arrayed in the radial direction and symmetric with respect to the diameter line. When the rotary sealing ring 5 is rotated in the normal direction, the first dynamic pressure generating channel generates dynamic pressure. When the rotary sealing ring 5 is rotated in the reverse direction, the second dynamic pressure generating channel generates dynamic pressure. For example, an L-shaped channel having a constant depth and width can be used as each of the first and second dynamic pressure generating channels.

In addition, under the condition in which the generation of metal ions does not need to be suppressed, the resin coating film 63 may be formed only on the portion 6a of the seal case 6, on which the O-rings 12 relatively move (slide) in accordance with the movement of the stationary sealing ring 7, of the portion of the seal case, with which the O-rings 12 come in contact. Furthermore, under the condition in which the contact resistance between the O-rings 12 and the resin coating film decreases, the material of the resin coating film 63 is properly selected depending on the property or sealing conditions of the sealed fluid. For example, when the sealed fluid has a possibility to erode the seal case 6, a resin coating film 63 made of corrosion resistant or chemical resistant material is formed on the portion of the seal case 6, with which the sealed fluid comes in contact. In this case, components of the mechanical seal 4, or components or portion of the seal case 6, with which the sealed fluid comes in contact, other than the seal case 6 are made of or coated with corrosion resistant or chemical resistant material. Accordingly, even when the sealed fluid has corrosiveness, an effective sealing function can be obtained by the mechanical seal.

Moreover, the rotary sealing ring 5 may be fixed to the other rotating shaft, which is fixed to the rotary member (for example, rotary table 1) other than the rotating shaft 2a, or a sleeve thereof. Furthermore, depending on the sealing conditions, the stationary sealing ring 7 can be fixed to the seal case 6, and the rotary sealing ring 5 can be held on the rotary member so as to move in the axial direction and so as not to be rotated relative to the rotary member.

The invention claimed is:

1. A mechanical seal comprising:
   a rotary sealing ring that is fixed to a rotating shaft; and
   a stationary sealing ring that is held by means of a pair of O-rings in a seal case through which the rotating shaft passes, so as to move in an axial direction thereof, the seal case being made of a metal, and wherein
   the O-rings are held engaging with a periphery of the stationary sealing ring, and come in press contact with an inner periphery of the seal case so as to give a secondary seal to a gap between the stationary sealing ring and the seal case, while allowing the stationary sealing ring to move in the axial direction thereof,
   a resin coating film is formed on the inner periphery of the seal case, and at least within a range in which the O-rings relatively move in accordance with the movement of the stationary sealing ring in the axial direction,
   the mechanical seal is a static pressure non-contact gas seal,
   the static pressure non-contact gas seal includes a communicating space sealed by the pair of O-rings between the seal case and the stationary sealing ring, the pair of O-rings being provided away from each other at a predetermined interval, and a seal gas ejecting passage formed as a series of passages that communicate with each other through the communicating space in the seal case and the stationary sealing ring, with a gap between the sealing end faces which serve as the opposite end faces of the rotary and stationary sealing rings, thereby so as to maintain the sealing end faces in proper non-contact state by introducing the seal gas under a predetermined pressure into the space between the sealing end faces through the seal gas ejecting passage,
   the static pressure non-contact gas seal is provided in a treatment device in which a driving unit of a rotary table is covered with a cylindrical plastic cover so as to shield a space between a treatment area where the rotary table is disposed and an area inside the plastic cover,
   the rotary sealing ring is fixed to the rotary table concentrically with the rotary axis thereof,
   the seal case is a cylindrical case which is disposed in the plastic cover and mounted on a supporting case of the driving unit,
   the stationary sealing ring is held on the inner periphery of the seal case so as to move in an axial direction thereof, the stationary sealing ring being coaxial with the rotary sealing ring and directly facing the rotary sealing ring,
   an annular cover shoulder contacting with an end of the seal case is formed on the inner periphery of the plastic cover,
   a seal gas supply passage is formed in the plastic cover for supplying the seal gas to the seal gas ejecting passage,
   the seal gas supply passage and the seal gas ejecting passage formed in the seal case are connected so as to communicate with each other at a portion where the cover shoulder and the seal case end come in contact, and
   the resin coating film is formed on a portion with which the seal gas and the sealed fluid come in contact, inclusive of a portion on which the O-rings slide, of the seal case.

2. The mechanical seal according to claim 1
   wherein the sealing end faces are maintained in non-contact state by generating a dynamic pressure in the space between the sealing end faces by means of a dynamic pressure generating channel, in addition to a static pressure by means of the seal gas, the dynamic pressure generating channel being formed on the sealing end face of one sealing ring.

3. The mechanical seal according to claim 1,
   wherein the resin coating film has a thickness in the range of 5 to 100 μm.

4. The mechanical seal according to claim 1,
   wherein the resin coating film has a thickness in the range of 20 to 40 μm.

5. The mechanical seal according to claim 1,
   wherein at least a portion on which the O-rings slide, of the surface of the resin coating film, is machined to be a smooth surface.

* * * * *